W. C. FAWKES.
CANDY PULLING MACHINE.
APPLICATION FILED DEC. 9, 1911.

1,050,356.

Patented Jan. 14, 1913.
2 SHEETS—SHEET 1.

Witnesses
W. Lewis Cook
W. C. Schmitt

Inventor
Wilbert C. Fawkes
F. Geisler
Attorney

W. C. FAWKES.
CANDY PULLING MACHINE.
APPLICATION FILED DEC. 9, 1911.

1,050,356.

Patented Jan. 14, 1913.

2 SHEETS—SHEET 2.

Witnesses
W. Lewis Cook
W. C. Schmitt

Inventor
Wilbert C. Fawkes

UNITED STATES PATENT OFFICE.

WILBERT C. FAWKES, OF PORTLAND, OREGON.

CANDY-PULLING MACHINE.

1,050,356. Specification of Letters Patent. Patented Jan. 14, 1913.

Application filed December 9, 1911. Serial No. 664,897.

*To all whom it may concern:*

Be it known that I, WILBERT C. FAWKES, a citizen of the United States, and a resident of Portland, county of Multnomah, and State of Oregon, have invented a new and useful Improvement in Candy-Pulling Machines, of which the following is a specification.

This invention has for its object to obtain a candy pulling machine which, in its action, shall simulate the manual process of candy pulling. As well known, such manual candy pulling process substantially consists in two operations which may be designated as a lap and a pull alternately repeated; that is to say, the candy is lapped over a hook in the first instance, and the strands of candy are then pulled, then re-lapped and re-pulled, and so on. In endeavoring to simulate such process by mechanical machinery, it has been found that unless one would have recourse to elaborate mechanism, it is a difficult matter to properly time the devices so as not to cause the pushing together of the candy strands instead of a pulling action, during certain intervals in the cycle of motion of the machine. In this connection I have discovered that an intermittent motion in certain of the coöperating devices is best adapted for producing the desired effect in a candy pulling machine, causing the machine to imitate very closely the manual candy pulling process.

Another main object of my present invention is to obtain a machine which is simple in its mechanical parts and operation, hence inexpensive to manufacture, and, which, furthermore, is dependable in its action.

It is also my particular purpose to so arrange my machine that it may be operated at small expense of power.

These purposes and incidental features I attain in the machine hereinafter described, the construction and operation of which is illustrated in the accompanying drawings.

Figure 1:
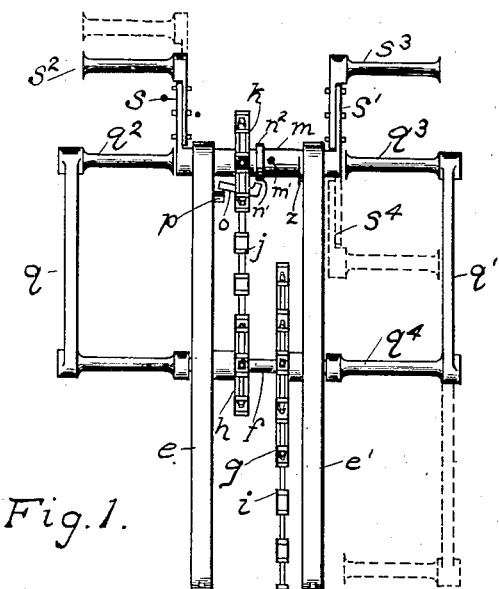
Figure 3:
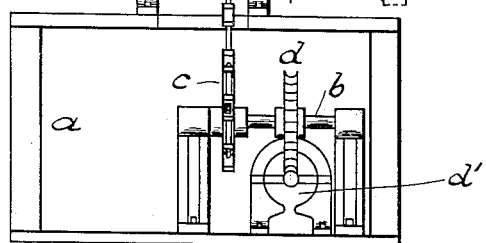
Figure 3:
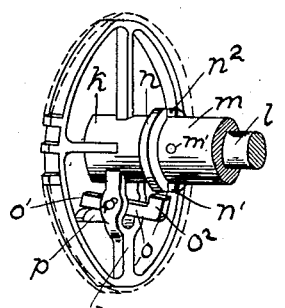
Figure 4:
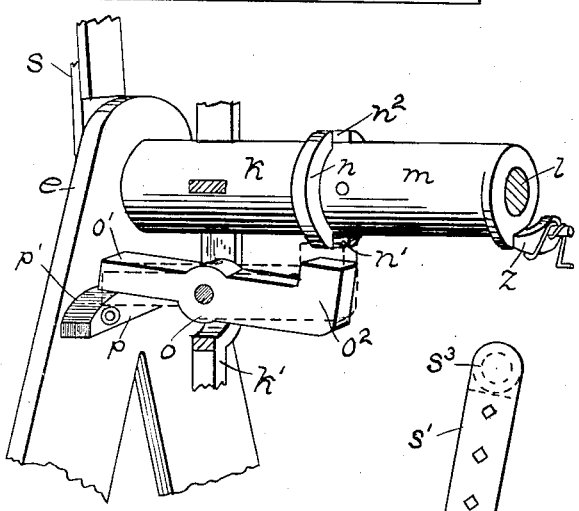
Figure 2:
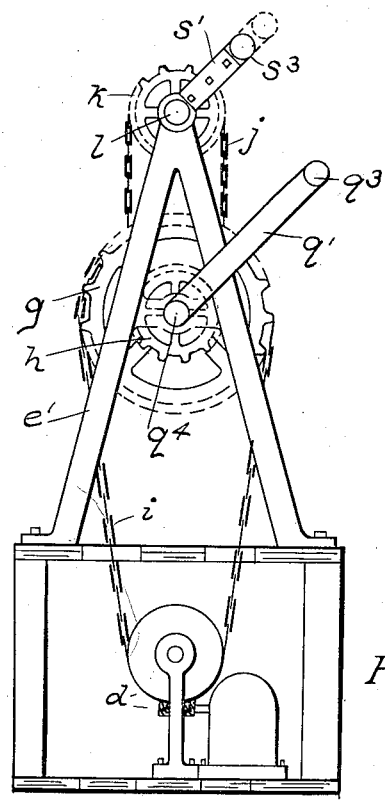
Figure 12:
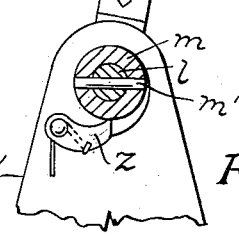

In the latter: Figure 1 shows a front elevation of my machine; Fig. 2 is an elevation of the right side of the machine, with regard to the position thereof shown in Fig. 1; Fig. 3 is a perspective detail of the sprocket wheel and the counter shaft on which it is mounted, included in the motion transmitting devices of my mechanism; Fig. 4 is a perspective detail on larger scale of the same devices shown in Fig. 3 and additional related parts, also showing one of the bearings of the counter shaft, parts of the sprocket wheel being broken away; Figs. 5 to 11, inclusive, are diagrammatic illustrations of the mode of operation of my machine, during the candy pulling process; these views will be more fully described in the body of the specification; Fig. 12 is a sectional view of the sprocket wheel shaft, looking toward the interior of the right-hand standard in Fig. 1, illustrating the raised motionless position of the crank arm mounted on the countershaft, after having made half a revolution and is then at rest while the other crank is completing its revolution.

My machine consists of a base, $a$, in which is rotatably mounted a driven shaft $b$, on which is rigidly mounted a sprocket wheel $c$. The shaft, $b$, is driven by any convenient means including a worm and a worm wheel $d$, the worm being driven by any convenient motor represented by $d'$. On the base, $a$, are mounted standards, $e$, $e'$, in which is journaled a shaft, $f$, on which are rigidly mounted a sprocket wheel $g$ and a sprocket pinion $h$. The sprocket wheel $g$ is connected by sprocket chain $i$ with the sprocket pinion $c$. On the shaft, $b$, the sprocket pinion $h$ is connected by a sprocket chain $j$ with a sprocket pinion $k$, loosely mounted on a shaft $l$, journaled in the upper part of the standards, $e$, $e'$, as illustrated in Figs. 2 and 4. On the shaft, $l$, is mounted a sleeve $m$, provided with a collar $n$, in which is cut opposite grooves $n'$, $n^2$. The sleeve, $m$, is pinned in place on the shaft, $l$, by a pin $m'$. The sprocket pinion $k$ is of the same diameter as the sprocket pinion $h$, its spoke $k'$ is bifurcated, and in such bifurcated portion is pivoted a pawl $o$. On the standard $e$ is provided a rib $p$, the upper surface $p'$ of which is convexed. The shaft $f$ has a lateral extension at both extremities, and on such extensions are mounted arms $q$, $q'$, provided with perpendicular pins $q^2$, $q^3$, respectively. The shaft, $l$, likewise has portions projecting exteriorly of the standards, $e$, $e'$, and thereon are mounted arms $s$, $s'$, provided with perpendicular pins $s^2$, $s^3$, respectively. The arms $s$, $s'$ are preferably made adjustable as to length so that the pins $s^2$, $s^3$ may be adjusted relatively to the axis of the arms $q$, $q'$.

It will be noted from the construction of the machine described, that it really represents two machines, in other words, either side of the machine working independently in the process of pulling candy, but permitting two batches of candy to be worked simultaneously.

It will be noted that the centers of the pins $q^2$, $q^3$ of the arms $q$, $q'$ coincide with the center of the shaft $l$.

In Figs. 5 to 11 inclusive, the circle, $s^3$, represents the pin, $s^3$, of the arm $s'$, and the broken circle, $t$, represents the path of said pin, and $t'$ the center of motion of said pin; the circle $q^3$ represents the pin $q^3$ of the arm $q'$, the broken circle $u$ represents the path of said pin $q^3$; $q^4$ represents the hub $q^4$ of the arm $a'$, which arm, as above mentioned, is mounted on the shaft $f$; and the line $z$ represents the candy strands.

Figure 5:
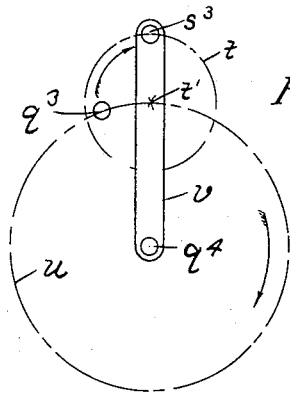
Figure 6:
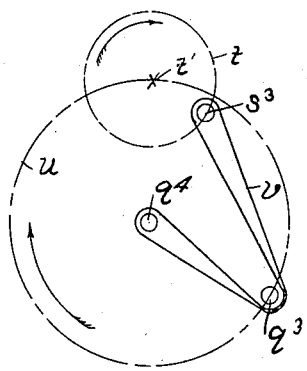
Figure 7:
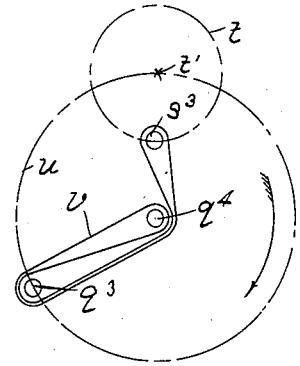
Figure 8:
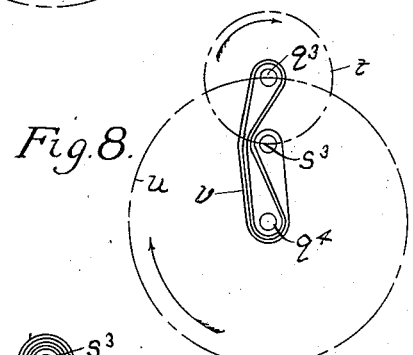
Figure 9:
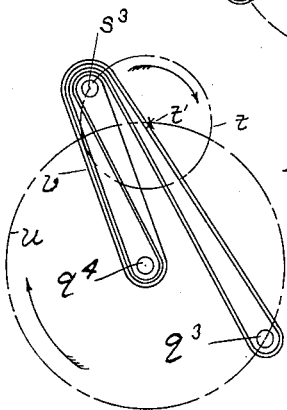
Figure 10:
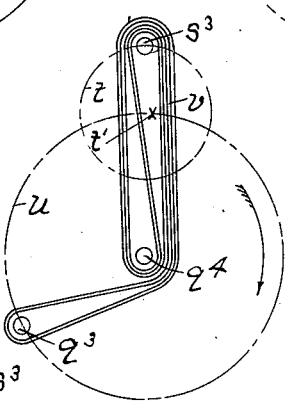
Figure 11:
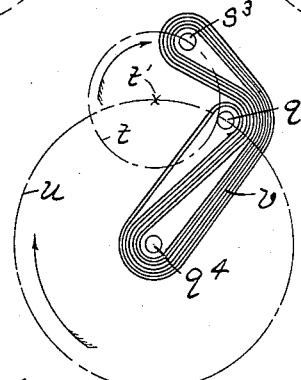

By referring now to Figs. 5 to 11, inclusive, the operation of my machine may be easily traced. In Fig. 5 the pins $q^3$ and $s^3$ are shown in approximately the same relative position as in Fig. 1, the candy strands, $z$, have been wrapped around the pin $s^3$ and the hub $q^4$ of the arm $q'$. In Fig. 6 the pins $q^3$ and $s^3$ have traveled over their respective courses approximately one-third of a revolution, and the pin $q^3$ has made contact with the candy strands $z$ and is exerting a pull on the upper portion of said candy strands. The pin $s^3$ upon completing a half revolution remains stationary at its lowest point, while the other pin $q^3$ completes the remaining half of its revolution. These movements are illustrated in Figs. 7 and 8. During the described movements the candy strands will have become lapped around the hub $q^4$ and the pin $s^3$, as also shown in Figs. 7 and 8. Fig. 9 illustrates the position of the pins $q^3$ and $s^3$ after a further movement of approximately one-third revolution, during which movement a pull is exerted on all the strands of the candy $z$, and after completing another half revolution the pin $s^3$ again rests while the candy is again lapped around the hub $q^4$, as shown in Fig. 10.
The completion of the second revolution of the pin $q^3$ finishes the circle of motion of my machine, and Fig. 11 shows the start of a new circle, the candy strands having been pulled without at any time being subjected to a pushing together motion; and the operation above described may be repeated indefinitely. The pin, $k$, is rotated constantly with the pinion $h$, but the arms, $s$, $s'$, are rotated only intermittently, making a half revolution only during each complete revolution of the pinion $k$, and thus, by reason of the described operative connections, during the complete revolution of the arm $q'$. In order words, the pinion $k$, being loosely mounted on the shaft $l$, rotates the latter only when the pawl $o$, carried by said pinion $k$, is in engagement with one or the other of the notches $n'$, $n^2$, of the sleeve, $m$, pinned on said shaft $l$. During each revolution of the pinion $k$ the shank of the pawl, $o$, is brought into contact with the rib $p$ on the standard $e$, tripping such pawl and causing it to pass out of engagement with the notch $n'$. Continued movement of the wheel $k$ brings the pawl $o$ over the notch 22, where it will gravitate into its active position, it being understood that the pawl is so pivoted that its head-end $o^2$ is the heavier. So that when the pinion $k$ is approximately opposite the position in which it is shown in Fig. 3 for example, the pawl becomes engaged with the notch $n^2$ of the sleeve $m$, rotating the latter a half revolution, or until tripped by the rib $p$, as shown in Fig.
4. Thus imparting irregular rotation to the sleeve $m$ and through shaft, $l$, to the arms $s$, $s'$ and pins $s^2$, $s^3$, so that each downward movement of the arms $q$, $q'$ is accompanied by a movement of the arms, $s$, $s'$, alternately up and down, as shown in Figs. 6 and 9, but each upward movement of the arms $q$, $q'$ constituting a lap, in the candy pulling operation, has no effect on the arms $s$, $s'$, as shown in Figs. 7 and 10. In the latter case, when in the raised position the arm $s'$ will next be carried to its highest position, but is prevented from falling back by the spring-operated ratchet member $y$, shown in Figs. 4 and 5. Although should the arms $s$, $s'$ be placed opposite, as $s^4$ in Fig. 1, no restraining means would be necessary.

I claim:

1. In a candy pulling machine comprising a primary crank arm, a secondary crank arm revolving on an axis parallel to that of the primary crank arm, said crank arms being respectively provided with opposing perpendicular pins at their extremities; and means for driving both crank arms at the same speed but adapted to permit one of said crank arms to remain at rest during one-half of the time of each revolution of the other crank arm.

2. In a candy pulling machine comprising a primary crank arm, a secondary crank arm revolving on an axis parallel to that of the primary crank arm, said crank arms being respectively provided with opposing perpendicular pins at their extremities; one of said arms being adjustable in length; and means for driving both crank arms at the same speed but adapted to permit one of said crank arms to remain at rest during one-half of the time of each revolution of the other crank arm.

3. In a candy pulling machine comprising a primary crank arm, a secondary crank arm revolving on an axis parallel to that of the primary crank arm, said crank arms being respectively provided with opposing perpendicular pins at their extremities, one of said arms being shorter than the other; and means for driving both crank arms at the same speed but adapted to permit one of said crank arms to remain at rest during one-half of the time of each revolution of the other crank arm.

4. In a candy pulling machine, the combination of a frame, a primary shaft, a counter shaft, said shafts journaled in said frame; a rigid crank-arm on the primary shaft, a rigid crank-arm on the secondary shaft, perpendicular opposing pins on the extremities of said crank arms respectively; and means for driving the primary shaft, means for driving the counter shaft from the primary shaft, the latter driving means adapted to cause the counter shaft to revolve only during the first-half revolution of the primary shaft and to remain at rest during the second-half revolution of said primary shaft.

5. In a candy pulling machine, the combination of a frame, a primary shaft, a counter shaft, said shafts journaled in said frame; a rigid crank-arm on the primary shaft, a rigid crank-arm on the secondary shaft, perpendicular opposing pins on the extremities of said crank arms respectively; and means for driving both shafts at the same speed, said means arranged for driving the counter shaft from the primary shaft, the latter driving means adapted to cause the counter shaft to revolve only during the first-half revolution of the primary shaft and to remain at rest during the second-half revolution of said primary shaft.

6. In a candy pulling machine, the combination of a frame, a primary shaft, a counter shaft, said shafts journaled in said frame; a rigid crank-arm on the primary shaft, a rigid crank-arm on the secondary shaft, perpendicular opposing pins on the extremities of said crank arms respectively, one of said arms being adjustable in length; and means for driving the primary shaft, means for driving the counter shaft from the primary shaft, the latter driving means adapted to cause the counter shaft to revolve only during the first-half revolution of the primary shaft and to remain at rest during the second-half revolution of said primary shaft.

7. In a candy pulling machine, the combination of a frame, a primary shaft, a counter shaft, said shafts journaled in said frame; a rigid crank-arm on the primary shaft, a rigid crank-arm on the secondary shaft, perpendicular opposing pins on the extremities of said crank arms respectively; means for driving both shafts at the same speed; a gear mounted on the primary shaft, a loose gear on the counter shaft, said gears operatively connected; and means causing such loose gear to be automatically engaged with said counter shaft during one-half of the revolution of the primary shaft and releasing the counter shaft during the completion of the revolution of the latter, said driving means being adapted to rotate both the primary and counter shafts at the same speed.

8. In a candy pulling machine, the combination of a frame, a primary shaft, a counter shaft, said shafts journaled in said frame; a rigid crank-arm on the primary shaft, a rigid crank-arm on the secondary shaft, perpendicular opposing pins on the extremities of said crank arms respectively; means for driving both shafts at the same speed; a gear mounted on the primary shaft, a loose gear on the counter shaft, said gears operatively connected; means causing such loose gear to be automatically engaged with said counter shaft during one-half of the revolution of the primary shaft and releasing the counter shaft during the completion of the revolution of the latter, said driving means being adapted to rotate both the primary and counter shafts at the same speed; and means for restraining the counter shaft during the interval it is released from the driving means and while the primary shaft is completing its revolution.

9. In a candy pulling machine, the combination of a frame, a primary shaft, a counter shaft, said shafts journaled in said frame; a rigid crank-arm on the primary shaft, a rigid crank arm on the secondary shaft, perpendicular opposing pins on the extremities of said crank arms respectively, one of said arms being adjustable in length; means for driving both shafts at the same speed; a gear mounted on the primary shaft, a loose gear on the counter shaft, said gears operatively connected; means causing such loose gear to be automatically engaged with said counter shaft during one-half of the revolution of the primary shaft and releasing the counter shaft during the completion of the revolution of the latter, said driving means being adapted to rotate both the primary and counter shafts at the same speed; and means for restraining the counter shaft during the interval it is released from the driving means and while the primary shaft is completing its revolution.

10. In a candy pulling machine, the combination of a pulling arm having continuous rotary motion, a second rotating arm traveling with and at the same speed as the first mentioned arm, but so traveling during one half the revolution of such first mentioned arm only, and remaining at rest while the latter completes its revolution, and the path of one arm intersecting that of the other.

11. In a candy pulling machine, the combination of a pulling arm having continuous rotary motion, a second rotating arm traveling with and at the same speed as the first mentioned arm, but so traveling during one half the revolution of such first mentioned arm only, and remaining at rest while the latter completes its revolution, the radius of the last mentioned arm being lesser than that of the first mentioned arm, and the path of one arm intersecting that of the other.

12. In a candy pulling machine, the combination of a pulling arm having continuous rotary motion, a second arm having intermittently a semi-circular motion during each interval that the first mentioned arm completes one revolution, and the path of one arm intersecting that of the other.

13. In a candy pulling machine, the combination of a pulling arm having continuous rotary motion, a second arm having intermittently a semi-circular motion during each interval that the first mentioned arm completes one revolution, the radius of the last mentioned arm being lesser than that of the first mentioned arm, and the path of one arm intersecting that of the other.

WILBERT C. FAWKES.

Witnesses:
CECIL LONG,
W. LEWIS COOP.